United States Patent
White et al.

[11] Patent Number: 6,091,043
[45] Date of Patent: Jul. 18, 2000

[54] DEPOSITING METAL UPON AN ARTICLE

[75] Inventors: Dawn Roberta White, Ann Arbor; Daniel Edward Wilkosz, Ypsilanti; Sankaran Subramaniam, Farmington, all of Mich.

[73] Assignee: Ford Global Technologies, Inc., Dearborn, Mich.

[21] Appl. No.: 09/272,487

[22] Filed: Mar. 19, 1999

[51] Int. Cl.[7] .................................................. B23K 9/04
[52] U.S. Cl. ................................... 219/76.14; 219/137 R
[58] Field of Search ............................ 219/76.15, 76.14, 219/76.1, 137 R

[56] References Cited

U.S. PATENT DOCUMENTS 2,998,922  9/1961  Gibson .
3,064,114  11/1962  Cresswell et al. .
4,970,091  11/1990  Buhrmaster et al. .
5,616,258  4/1997  Dreizin et al. ....................... 219/137 R

*Primary Examiner*—Clifford C. Shaw
*Attorney, Agent, or Firm*—Damian Porcari; Roger L. May

[57] ABSTRACT

A method of electric arc spraying metal upon an article. The method comprises providing an article to be sprayed, providing a supply of fusible metal feedstock, providing a metal feedstock feeding device, and providing a substrate of conductive heat resistant material. The substrate has a centrally disposed orifice extending therethrough. A source of electrical current is provided having a first electrode electrically coupled with an end of the metal feedstock, and a second electrode electrically coupled with the plate of conductive material. The source of current is activated to establish an electric arc between the metal feedstock and the plate of conductive material. The electrical arc creates a droplet spray of metal from the metal feedstock. The droplet spray is directed through the orifice in the substrate towards the article. The power supply is periodically pulsed between a first current and a second current.

18 Claims, 1 Drawing Sheet

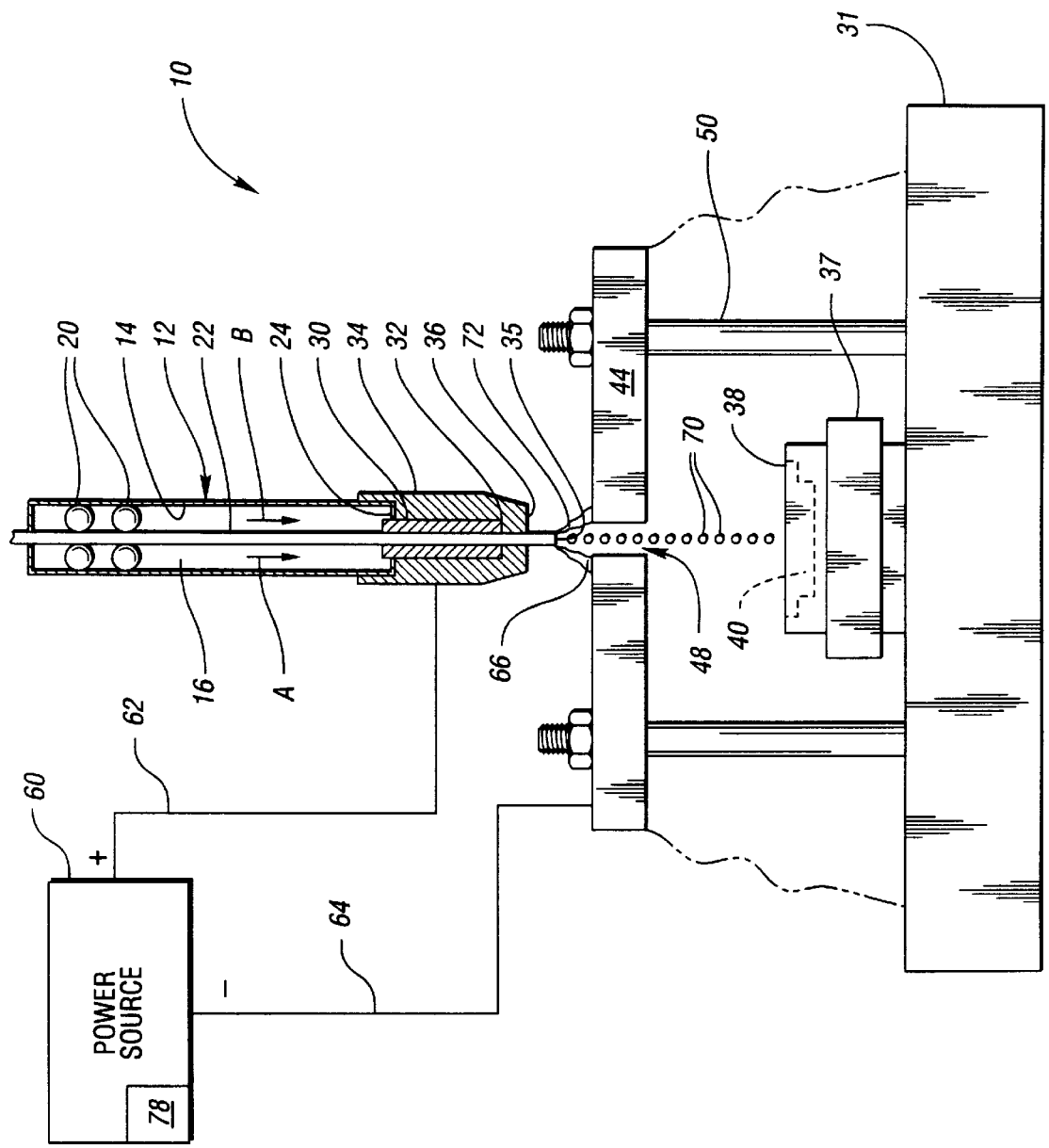

DEPOSITING METAL UPON AN ARTICLE

TECHNICAL FIELD

The present invention relates to a method and apparatus for depositing metal upon an article and more particularly relates to the use of an electric arc welding apparatus for spray depositing metal upon an article, such as a ceramic mold.

BACKGROUND OF THE INVENTION

Various techniques are available for depositing metals upon a mold. One such technique is single wire electric arc welding. Typically, in single wire electric arc welding, an electric arc is established between the tip of the single wire (i.e., an anode) and a metallic member (i.e., a cathode). The electric arc melts the tip of the wire to form metal droplets. Gas is fed into an arc chamber, usually coaxially to the wire, where it is expanded by the electric arc to form a plasma which comprises a highly heated gas stream carrying a spray of metal droplets from the electrode tip towards the mold. Typically, the current used to create the electric arc is constant throughout the entire electric arc welding process.

It has been well known in the art that the size and the velocity of the metal droplets created by the electric arc are directly proportional to the current employed to create the arc. For instance, high currents result in small droplets having a relatively high velocity, and low currents result in large globular droplets which are transferred to the mold at a relatively low velocity.

Microstructure and mechanical properties of a metal deposit are often affected by the size, velocity and temperature of the metal droplets used to form the deposit. As such there are many instances where it is desirable to produce small droplets, at relatively high velocities (in conventional constant current operation, a particular size of droplet can only have a particular velocity). One such instance is the filling of a narrow deep slot in a mold, where small droplets having a relatively high velocity are more likely to fill the mold without excessive porosity and bridging than is a spray of large droplets with low droplet velocity. In some instances, it may be more desirable to have small droplets having relatively low velocities. One such example might be when depositing the initial layers onto the ceramic mold, when it might be necessary to improve bonding between the metal and the ceramic. There might be cases where it might be necessary to have large droplets at high velocities. Such an example would be to fill the wider areas of the mold or after a few layers have been deposited.

It is also desirable to produce narrow controllable metal sprays having diameters of about 6–9 mm to produce fine features in bulk, net shape or near net shape, spray deposits. Another advantage of a relatively narrow metal spray is a more efficient use of metal as there is less metal being deposited outside of the mold.

Accordingly, it is an object of the present invention to provide a method of controlling the droplet size independently of droplet velocity for a metal spray. It is yet another object of the present invention to provide a relatively narrow metal spray.

DISCLOSURE OF THE INVENTION

The present invention meets the above objects and others by providing a method of spraying metal upon an article. The method comprises providing an article to be sprayed. A supply of fusible metal feedstock and a metal feedstock feeding device are provided. A substrate of conductive heat resistant material is provided. The substrate has a centrally disposed orifice extending therethrough. A source of electrical current is provided. The source of electrical current has a first electrode electrically coupled with an end (i.e., the anode) of the metal feedstock, and a second electrode electrically coupled with the plate of conductive material (i.e., the cathode). The source of current is activated to establish an electric arc between the metal feedstock and the plate of conductive material to create a droplet spray of metal from the metal wire feedstock. The droplet spray is directed through the orifice in the substrate towards the article. The power supply is periodically pulsed between a first current and a second current.

BRIEF DESCRIPTION OF THE DRAWINGS

The FIGURE is a schematic illustration of an apparatus for use with the present invention.

BEST MODE FOR CARRYING OUT THE INVENTION

Referring to the FIGURE, an electric arc welding apparatus 10 for use with the present invention is shown. The welding apparatus 10 comprises an essentially cylindrical housing 12. The housing 12 has an axially extending inner surface 14 which defines a housing passage 16. Preferably, the inner surface 14 is lined with a nonconductive lining (not shown) to absorb heat generated during welding.

The housing passage 16 extends axially and houses a pair of rollers 20 for guiding a consumable metal wire 22 towards an outlet 24 of the housing 12. It should be noted that while the rollers 20 are preferably housed within the housing 12, the rollers could be disposed outside and above the housing.

The metal wire 22 preferably has a diameter of about 0.6 mm to about 2.5 mm. It should be noted, however, that the metal wire 22 could have a diameter which is less than 0.6 mm or more than 2.5 mm. The metal wire 22 is of indefinite length and is continuously feedable, preferably at about 100 to about 1000 in./min., and more preferably at about 200 to about 500 in./min., from a metal wire feedstock toward the outlet 24 as shown by arrow A. The metal wire 22 is preferably aluminum or an aluminum alloy but could also be carbon steel having a carbon content in the range of 0.01 to 0.9% by weight. Additionally, it should be noted that metal bar or rod feed stock could be used instead of the metal wire 22.

A contact tip 30 is secured to the housing 12 in any suitable manner and is coaxial with the housing 12 and the wire 22. The contact tip 30 is preferably made of copper. The metal wire 22 is feedable through the contact tip 30 towards and through a contact tip outlet 32.

A housing nozzle 34 is secured to the housing 12 in any suitable manner and is coaxial with the housing 12 and the contact tip 30. The nozzle 34 extends circumferentially around the contact tip 30 and converges at an end to form a nozzle outlet 36.

The metal wire 22 is continuously fed from the metal feedstock through the roller 20, through the contact tip 30, and through the nozzle 34, toward an article 38 to be deposited. The metal wire 22 has a tip 35 which extends past the nozzle outlet 36. The article 38 is preferably retained on a movable carriage 37 on a table 39 to achieve relative movement between the metal wire 22 and the article 38.

The article 38 is preferably a nonconductive ceramic mold for receiving the molten droplets, thus forming a metal deposit. Preferably, the article 38 is preferably used as a mold for forming a prototype tooling such as a die or mold and preferably has a cavity 40 which is relatively narrow and deep. Preferably, the cavity 40 has a width of about 5–10 mm and a depth of about 30–50 mm.

The apparatus 10 further includes a substrate 44 of conductive heat resistant material which is disposed between the article 38 and the contact tip 30. The substrate 44 is preferably spaced apart 1.5 cm from the nozzle outlet 36 and about 10–20 cm from the article 38. The distance between the tip of the metal wire 35 and the substrate 44, forms an arc gap of about 5–8 mm, but may vary. The substrate 44 is preferably formed of copper or molybdnenum and is water cooled (not shown).

The substrate 44 has a centrally disposed orifice 48 extending axially through the substrate 44. The orifice 48 is preferably about 8–10 mm in diameter. The substrate 44 is preferably provided with a plurality of adjustable set rods 50 for adjusting the height of the substrate 44 relative to the article 38 and the nozzle 34. While the substrate 44 is illustrated as being detached from the housing 12, it should be appreciated that the substrate 44 could be attached to the housing 12.

A shielding gas is provided and is directed to flow through the passage 16 as shown by arrow B. The shielding gas is preferably an inert gas such as argon or helium. The shielding gas may also contain a small amount of oxygen (about 2%) or carbon dioxide. The shielding gas helps to form a high conducting arc plasma 72, as will be explained below in more detail.

The apparatus 10 further includes a power source, schematically indicated at 60. The power source 60 includes a first electrode 62 which is electrically connected with the tip 35 of the metal wire 22 through the contact tip 30, and a second electrode 64 which is electrically connected with the substrate 44. The electrode 62 is preferably a positive electrode and the electrode 64 is preferably a negative electrode. The power source 60, via the electrodes 62 and 64, provides an arc current through the plasma 72 for establishing an electric arc 66 between the tip 35 of the continuously fed metal wire 22 and the substrate 44, i.e., the arc gap.

The electric arc 66 is a sustained electrical discharge through the plasma 72, generated by electrically and thermally excited shielding gas atoms and ionized metal vapors from the melting wire 22. The arc 66 is maintained between the tip 35 of the wire 22 and the substrate 44. The tip 35 of the metal wire 22 is continuously fed into the arc 66 and is melted by the heat of the arc 66, generating a spray of molten metal droplets 70. The width (i.e., the footprint) of the spray of metal droplets preferably has a diameter of about 6–8 mm. The shielding gas and the metal droplets 70 form an arc plasma 72 which is directed through the orifice 48 towards the article 38. The width (i.e., footprint) of the arc plasma 72 preferably has a diameter of less than or about that of the orifice 48, and more preferably has a diameter of about 6–8 mm.

The power source 60 includes a pulsing device 78 for pulsing the current which establishes the electric arc 66. The power supply 60 is preferably a Miller Maxtron 450 welding power supply and is preferably interfaced with the pulsing device 78 which is preferably an AMET Inc., welding power supply controller which allows independent programming and control of the pulsing parameters.

The pulsing device 78 is capable of cyclically varying the current between a first, peak, current and a second, back, current, which is lower than the first current. Preferably, the pulsing device 78 produces cycles which deliver the peak current for a first predetermined period of time and then the back current for a second predetermined period of time and alternates thereafter.

The pulsing device 78 preferably delivers about 50 to about 1000 cycles per second, i.e., has a pulsing frequency of about 50–1000 hertz (Hz), more preferably about 200 to about 600 hertz, and most preferably 225 to about 400 hertz.

The peak current is preferably a value between about 250 to about 1000 amps (A) and more preferably between about 250 to about 400 amps.

The back current must be minimally high enough to maintain the electric arc and is preferably a value between about 50 to about 200 amps.

The duty cycle (i.e., the percentage of time the peak current is maintained per cycle) is preferably between about 10–70%, and is more preferably between about 10–40%.

The apparatus 10 is able to produce a relatively uniform stream of droplets 70 having droplet sizes between about 0.25 to about 8 mm in diameter, and more preferably about 0.25–5 mm. The droplet size, as well as the droplet velocity, is controllable by pulsing the current. An important aspect of the present invention is that the distribution of the droplet size is very narrow, and is preferably on the order of about ±10%, and more preferably ±2%.

Also, pulsing enables a droplet velocity between about 40 to about 600 centimeters per second to be achieved. Thus, to further illustrate the present invention, the present invention makes it possible to produce metal droplets having a particle size of anywhere between about 0.25 to about 5 mm and a velocity of anywhere between about 40 to about 600 centimeters per second. For instance, it is contemplated that the present invention can produce metal droplets having a particle size of 0.25 mm and a velocity of 40 centimeters per second as well as metal droplets having a particle size of 5 mm and a velocity of 600 centimeters per second.

The following examples illustrate the present invention in a non-limiting manner.

EXAMPLES 1–3

A 1.2 mm diameter aluminum alloy wire (4047 alloy from Alcotec in Michigan) is fed through a gas metal arc welding gun made by Tweco of Wichita, Kansas. The Tweco is similar to the apparatus described above.

For example 1, the wire is continuously fed into the welding gun at a rate of 416 inches per minute, the peak current is 400 amps, the back current is 150 amps, the pulsing frequency is 400 hertz and the duty cycle is 40 percent. For example 2, the wire is continuously fed into the welding gun at a rate of 198 inches per minute, the peak current is 400 amps, the back current is 100 amps, the pulsing frequency is 400 hertz and the duty cycle is 10 percent. For example 3, the wire is continuously fed into the welding gun at a rate of 304 inches per minute, the peak current is 300 amps, the back current is 150 amps, the pulsing frequency is 225 hertz and the duty cycle is 25 percent. The droplet sizes, droplet acceleration, and droplet velocities for examples 1, 2 and 3 were recorded and are displayed in Table I below.

The droplet size, droplet acceleration, and the droplet velocity were measured using a Redlake HYCAM 400 ft model, 16 mm high speed motion picture camera which records about 2,000 frames per second. As the metal spraying process is taking place, the Redlake high speed camera records the operation. To measure the drop size, the film of the metal spraying operation is digitized (played back) frame by frame and a measurement software (Sigmaplot) is utilized by using the diameter of the feed wire as a reference point to ascertain the droplet size of the metal droplets.

The droplet velocity and acceleration are ascertained by playing the images back one frame at a time and measuring the distance a particular droplet moves relative to a fixed point. A distance vs time plot is drawn from the high speed photographic images. A quadratic equation is fitted to the experimental data, by using a plotting software like Sigmaplot. This provides the relationship between distance and time. Double differentiation of the distance equation with respect to time yields the acceleration of the droplet. The velocity is continuously changing and the velocity at a particular instant is measured by dividing the distance by the time in successive frames.

TABLE I

| Pulsing Schedule | Droplet Size | Droplet Acceleration | Droplet Velocity 1 Frame (0.4 m sec.) After Detachment |
| --- | --- | --- | --- |
| EXAMPLES | | | |
| 1) Peak current = 400A Back current = 150A Pulsing frequency = 400Hz Duty cycle = 40% Wire feed = 416 in/min | 1 mm | 770 m/s$^2$ | 520 cm/s |
| 2) Peak current = 400A Back current = 100A Pulsing frequency = 400Hz Duty Cycle = 10% Wire feed = 198 in/min | 1.1 mm | 120 m/s$^2$ | 100 m/s |
| 3) Peak current = 300A Back current = 150A Pulsing frequency = 225Hz Duty cycle = 25% Wire feed = 304 in/min | 1.2 mm | 385 m/s$^2$ | 225 cm/s |

COMPARATIVE EXAMPLE 1

A 1.2 mm diameter wire of 4047 alloy is fed through the same arc welding gun used in examples 1–3 at a rate of 235 inches per second. An electric arc is established with a constant current of about 160 amps. At a constant current of about 160 amps, droplets having a size of about 1.1 mm in diameter, a velocity of about 230 centimeters per second, and an acceleration of about 130 meters per second squared were achieved.

As can be seen from the above examples, by varying the processing parameters of the metal spraying operation, and more particularly varying the peak current, back current, pulsing frequency and duty cycle of the power supply, the droplet size and droplet velocity can be varied independently of each other.

While the best modes for carrying out the invention have been described in detail, those familiar with the art to which this invention relates will recognize various alternative designs and embodiments for practicing the invention as defined by the following claims.

What is claimed is:

1. A method of spraying metal upon an article, the method comprising:

providing an article to be sprayed;

providing a supply of fusible metal feedstock;

providing a metal feedstock feeding device;

providing a substrate of conductive heat resistant material, the substrate having a centrally disposed orifice extending therethrough;

providing a source of electrical current, the source of electrical current having a first electrode electrically coupled with an end of the metal feedstock, and a second electrode electrically coupled with the plate of conductive material;

activating the source of current to establish an electric arc between the metal feedstock and the plate of conductive material, the electrical arc creating a droplet spray of metal from the metal feedstock, the droplet spray being directed through the orifice in the substrate towards the article;

the power supply being periodically pulsed between a first current and a second current.

2. The method of claim 1 wherein the article is made of a non-conductive material.

3. The method of claim 2 wherein the article is made of ceramic material.

4. The method of claim 1 wherein the article has a cavity which receives at least a portion of the metal spray.

5. The method of claim 1 wherein the first current is higher than the second current.

6. The method of claim 5 wherein the first current is maintained for a first period of time and the second current is maintained for a second period of time, the second period of time being more than the first period of time.

7. The method of claim 1 wherein the metal feedstock has a diameter of about 0.6–2.55 mm and the droplet spray comprises a plurality of droplets, the droplets having a diameter of between about 0.25 to 8 mm with a distribution of about ±10%.

8. The method of claim 7 wherein the droplets have a velocity of between about 40 to about 600 cm/sec.

9. The method of claim 7 wherein the droplet spray has a diameter of about 6–8 mm.

10. An apparatus for spraying metal upon an article, the apparatus comprising:

a metallic stock feeder;

a contact nozzle having an aperture through which a metallic stock is feedable;

a substrate of conductive heat resistant material, the substrate having a centrally disposed orifice extending axially through the substrate, the nozzle and the substrate being disposed above an article to be coated by the metal spray formed from the metal stock;

a power source for establishing an electric arc between an end of the metallic stock and the substrate, the power source having a first electrode electrically connected with the end of the metallic stock, and a second electrode electrically connected with the substrate of conductive heat resistant material, the power source capable of being pulsed between a first current and a second current.

11. The apparatus of claim 10 wherein the article is made of a non-conductive material.

12. The apparatus of claim 11 wherein the article is made of ceramic material.

13. The apparatus of claim 10 wherein the article has a cavity which receives at least a portion of the metal spray.

14. The apparatus of claim 10 wherein the first current is higher than the second current.

15. The apparatus of claim 14 wherein the first current is maintained for a first period of time and the second current is maintained for a second period of time, the second period of time being more than the first period of time.

16. The apparatus of claim 10 wherein the metal feedstock has a diameter of about 0.6–2.55 mm and the droplet spray comprises a plurality of droplets, the droplets having a diameter of between about 0.25 to 8 mm with a distribution of about ±10%.

17. The apparatus of claim 16 wherein the droplets have a velocity of between about 40 to about 600 cm/sec.

18. The apparatus of claim 16 wherein the droplet spray has a diameter of about 6–8 mm.

* * * * *